Patented Jan. 24, 1933

1,895,019

UNITED STATES PATENT OFFICE

RONALD SIDNEY BARNES, OF GRANGEMOUTH, DUNCAN SERVICE, OF FALKIRK, AND JOHN THOMAS, OF POLMONT, SCOTLAND, ASSIGNORS TO SCOTTISH DYES LIMITED, A CORPORATION OF GREAT BRITAIN

ART OF COLORING

No Drawing. Application filed March 26, 1931, Serial No. 525,600, and in Great Britain March 31, 1930.

This invention relates to the art of coloring especially to the art of dyeing, this term including printing and the like, and more particularly to the dyeing of mordant colors.

The object of the invention is to provide improved or modified processes in the art of coloring, particularly in the dyeing of mordant colors. We have found that by taking the sulphuric ester of alizarine in which the sulphuric ester is attached to the β-hydroxy group, we can obtain Alizarine red shades by dyeing from a bath containing the ester along with aluminium sulphate and calcium acetate, and then steaming. In this way the alizarine is obtained on the fibre as a mordant color by a much simpler process than the usual one in which alizarine itself is applied to the previously mordanted fibre. This is a matter of considerable importance, particularly when carried out on a practical or large scale, and the invention is regarded as having a broad basis.

The invention in brief consists in the process in the art of mordant coloring which comprises the application of a soluble ester of a mordant dyestuff along with the mordant, followed after impregnation by a hydrolytic treatment, for example, steaming.

The invention also consists in a process according to which esters are prepared by treating alizarine with the sulphur trioxides of pyridine or other tertiary bases or substances capable of producing such trioxides, the treatment being carried out in the presence of a tertiary base.

The invention also consists in a process according to either of the preceding two paragraphs applied to esters of alizarine and esters of alizarines generally, as well as other mordant dyestuffs.

The invention also consists in a process according to either of the preceding three paragraphs or substantially as described for the production of the disulphuric ester of alizarine.

The invention also consists in a process which comprises the utilization of sulphuric esters of alizarine (in which the sulphuric ester is attached to the b-hydroxy group) in the art of coloring by dyeing from a bath containing the ester, with aluminium sulphate and calcium acetate, and then steaming.

The invention also consists in methods for the production of starting esters, such as may be used in the processes of any of the preceding five paragraphs, substantially as described.

The invention also consists in processes substantially as described.

The invention further consists in products which may be made by processes substantially as described, especially when made by those processes or by the obvious chemical equivalents thereof.

The following examples illustrate how the invention may be carried into effect, references to parts and to percentages being to parts and percentages by weight, and reference to pressure being to pressure in pounds per square inch above atmosphere.

Example 1

15 parts of alizarine, 100 parts of pyridine and 50 parts pyridine sulphur trioxide are stirred together and heated to 75° C. After stirring for about 15 to 30 minutes, the whole is allowed to cool, and the product filtered off. This is obtained in the form of the pyridine salt of the ester.

Example 2

This is an example of the use of the ester for the production of alizarine red shades on cotton. The ester is dissolved in a solution containing 10% of crystalline aluminium sulphate $Al_2(SO_4)_3 18H_2O$ and 1% of calcium acetate calculated on the volume of the liquor. The cotton is then entered and dyed for 30 minutes at 60° C. It is removed from the dyeing bath and rinsed in water, impregnated with soluble oil, and then dried, and steamed for one hour at 15 lbs. pressure.

Example 3

This is an example of printing cotton with alizarine ester. The printing paste is made up as follows:—

|  | Parts |
|---|---|
| Alizarine ester 25% paste | 5.0 |
| British gum | 13.7 |
| Acetic acid 9° Tw | 1.0 |
| Aluminium sulphocyanide | 5.0 |
| Calcium acetate 23° Tw | 0.3 |
|  | 25. |

The constituents being added in the order given are printed on the cloth which is then dried on the hot roller, steamed for 30 minutes at 15 lbs. pressure, boiled for 10 minutes in 0.5% soap solution.

Example 4

This is similar to Example 3 but 0.5 part of the British gum in the printing paste are replaced by equal quantity of 20% soluble oil.

Example 5

This is an example of the use of alizarine ester on natural silk.

1 part of 25% ester paste is dissolved in 200 parts of 1% solution of aluminium sulphate. The silk is then entered cold and the bath gradually taken up to the boil, and then while boiling for a further ¾ of an hour 5 parts of a 10% solution of calcium acetate gradually added. The silk is then removed, rinsed in a 1% sodium arsenate solution at 60° C. for 10 minutes, soaped for ½ an hour in a boiling 1% soap bath, rinsed and dried.

Example 6

This is an example of the production of the disulphuric ester of alizarine.

10 parts of alizarine in the form of a dry powder, 100 parts of pyridine sulphur trioxide and 10 parts of pyridine are heated together at 110° C. for two hours when the melt becomes almost solid, 50 cc. of pyridine are stirred in and the mixture allowed to cool; the solid is filtered off, and washed with water until the filtrates are acid free.

The product is a disulphuric acid ester of alizarine.

Example 7

This is an example of the dyeing of disulphuric ester on cotton.

The ester is dissolved in a solution containing 5 parts per 100 of crystalline aluminium sulphate. The cotton is entered cold, and the whole gradually taken up to 100° C. during ½ an hour; a further boiling is given for ¾ of an hour during which time 5 parts of calcium acetate are gradually added. The dyed goods are then lifted from the bath and worked for 10 minutes in a 2% solution of sodium arsenate at 60° C. This is followed by immersion in a 10% solution of soluble oil for 10 minutes. The treated material is then removed and steamed for ½ an hour to 1 hour at 15 lbs. pressure, soaped and dried.

Example 8

This comprises the substitution for alizarine esters referred to in previous examples of other alizarine esters for instance the ester of 1.2.6. trihydroxy-anthraquinone. 1:2:6-trihydroxy-anthraquinone is Flavopurpurine (Alizarine X) Color Index No. 1039.

Example 9

This is an example of the application of the ester of alizarine to wool on a chrome mordant. 10 parts of the woolen material are mordanted with 200 parts of a solution containing 0.3 parts of potassium bichromate and 0.1 parts of sulphuric acid. Sufficient ester paste corresponding to one part of the dry product is introduced into a bath containing 600 parts water and 2 parts of 10% solution of calcium acetate. The cloth, mordanted as above, is entered at 80° C. taken to the boil and boiled for an hour, during which time 10 parts of 5% sulphuric acid are gradually added. The process is completed by boiling vigorously for a further hour.

Example 10

This is an example of the application of the alizarine ester on wool by the top-chrome method. The dye bath is made up with a requisite quantity of the dyestuff in 600 parts of water. The wool is then entered at 80° C. taken to the boil and boiled for 45 minutes during which time 5 parts of 5% acetic acid and then 2 parts of 5% sulphuric acid are gradually added. 2 parts of 10% calcium acetate solution are then added and boiled for a further 15 minutes, when 25 parts of 1% potassium bichromate solution are added and the whole boiled for a further hour.

Example 11

This is an example of the application of the alizarine ester on wool by the metachrome method. The requisite quantity of the alizarine ester is dissolved in 600 parts of water with 0.2 parts of potassium chromate, 0.1 part of ammonium sulphate and 2 parts of a 10% solution of calcium acetate. The temperature is taken to 80° C. and the substances thoroughly mixed and dissolved. The material is now entered and the whole raised to the boil, a vigorous boil is then given for 1 to 2 hours until the requisite shade is obtained.

This example like Numbers 9 and 10 give fast shades, slightly duller and redder than alizarine itself, and the methods are suitable for use in circulating machines.

Example 12

20 parts of alizarine ester 75 parts of a 10% solution of aluminium sulphate

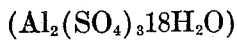

and 50 to 100 parts of water are heated together for 5 minutes at 80° C. The temperature is then lowered to 65° C., and the following substances then added, in order given, each being in the form of a 10% solution

| | Parts |
|---|---|
| Sodium carbonate | 40 |
| Sodium hydrogen phosphate | 35 |
| Calcium chloride (CaCl$_2$.6H$_2$O) | 60 |
| Soluble oil | 50 |
| Al$_2$(SO$_4$)$_3$.18H$_2$O | 50 |

The mixture is then taken up to the boil in 30 minutes, boiled for 1 hour and another 10 parts of sodium carbonate solution added. Boiling continued for a further 1 to 1½ hours, and the product filtered, washed thoroughly with hot water and dried.

Very bright lakes are obtained in this way. Brighter than those in which alizarine itself is used.

Example 13

This is another example of the application of the ester of alizarine on cotton, the ester being applied this time to mordanted cotton. The requisite quantity of soluble alizarine ester is entered into a bath containing 195 parts of water, 2 parts of calcium chloride and 5 parts of 5% acetic acid. The cotton previously mordanted with calcium and aluminium, is entered into the above bath at 80° C. taken to the boil and boiled vigorously for 2 hours, after which it is removed and soaped or oiled and steamed in the usual manner.

Example 14

This is an example of the application of the sulphuric ester from Alizarine brown WLS. This ester being dyed from a chrome mordant on wool. The material, previously mordanted by the usual treatment, in a bath containing 3% potassium bichromate and 1% of sulphuric acid calculated on the weight of the material, is entered at 80° into a bath containing the soluble alizarine ester. The temperature is raised to the boil, and exhaustion obtained by the addition of 5% sulphuric acid. The acid is added during the first hours boil and the dyeing is then continued for a further hour.

An alternative chrome mordant cloth which can be used is that prepared with potassium bichromate using potassium tartrate in lieu of sulphuric acid Alizarine brown WLS is identified in "Color index" as "No. 1035".

Example 15

This is a similar application to Example 14, except that an after-chrome method is employed. The dye bath is made up by dissolving the requisite quantity of the ester from Alizarine brown WLS in 600 parts of water, 10 parts of wool material are then entered at 80° C. The temperature raised to the boil and then 2 parts of concentrated lactic acid gradually added over a period of 1 hour, after which 30 parts of 1% potassium bichromate solution are added and the whole boiled for a further hour.

General

We repeat that the invention is regarded as of broad aspect. It is not limited to esters of alizarine but includes esters of alizarines generally, that is the other 1.2-dihydroxy-anthraquinone derivatives and other mordant dyestuffs.

The invention deals with manufacture, for example the manufacture of certain esters and also with use, namely the use of products which may be made according to the processes described or indicated whether made by those processes or not. In connection with use, it is pointed out that it is not necessary for the material to be first mordanted in a separate stage. Particular attention is drawn to the production of the disulphuric ester of alizarine.

The invention is not limited to any particular theory, but it appears that the hydroxy groups which are esterified in the alizarine by processes such as referred to above are the groups in the 1- and 2-positions.

As many apparently widely different embodiments of this invention may be made without departing from the spirit and scope thereof, it is to be understood that we do not limit ourselves to the specific embodiments thereof except as defined in the appended claims.

We claim:

1. Process for the production of dyeings (including printings) on textile materials, which comprises applying to the material, a soluble sulphuric ester of an anthraquinone body having at least two hydroxyl groups, two hydroxyl groups being in adjacent α-and β-positions, and at least the β-hydroxyl group being sulphated.

2. Process for the production of dyeings (including printings) on textile materials, which comprises applying to the material, a sulphuric ester of alizarine in which at least the β-hydroxyl group is sulphated.

3. Process according to claim 1 in which the sulphuric ester is applied to the material in the presence of a mordant.

4. Process according to claim 2 in which the alizarine sulphuric ester is applied to the material in the presence of a mordant.

5. Process according to claim 1 followed by the application of a mordant.

6. Process according to claim 2 followed by the application of a mordant.

7. Process according to claim 1 in which the sulphuric ester is applied to the material together with a mordant the application being followed by steaming.

8. Process according to claim 2 in which the alizarine sulphuric ester is applied to the material together with a mordant, the application being followed by steaming.

9. Process for the production of dyeings (including printings) on textile materials which comprises applying to the material an alizarine sulphuric ester (in which at least the β-hydroxyl group is sulphated), aluminium sulphate and calcium acetate, and subsequently steaming.

10. In the manufacture of mordant-dyed textile materials, the process which comprises impregnating the said materials with a beta-sulphuric ester of alizarine and a soluble salt capable of functioning as a mordant and subsequently submitting the impregnated material to a hydroltic treatment to produce said mordant-dyed textile materials.

11. In the manufacture of mordant-dyed textile materials, the process which comprises impregnating the said materials with a beta-sulphuric ester of alizarine and a soluble salt capable of functioning as a mordant and subsequently steaming the impregnated material.

12. The process of claim 10 in which the said sulphuric ester is in the form of a soluble salt.

13. In the manufacture of mordant-dyed textile materials, the process which comprises impregnating the said materials with a pyridine salt of beta-sulphuric ester of alizarine and a soluble salt capable of functioning as a mordant and subsequently submitting the impregnated material to a hydrolitic treatment to produce said mordant-dyed textile materials.

14. In the manufacture of mordant-dyed textile materials, the process which comprises impregnating the said materials with a composition comprising a pyridine salt of beta-sulphuric ester of alizarine, a soluble salt of aluminium and a soluble salt of calcium and subsequently steaming the impregnated material.

15. In the manufacture of mordant-dyed textile materials, the process which comprises impregnating cotton with an aqueous solution comprising a pyridine salt of beta-sulphuric ester of alizarine, aluminium sulphate and calicum acetate, drying the impregnated cotton and steaming the dried material.

16. In the manufacture of mordant-dyed textile materials, the step which comprises applying to textile materials an anthraquinone dyestuff containing within the molecule the following characteristic structure:

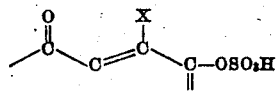

wherein X represents a hydroxy or sulphuric ester group.

17. The process of claim 16 wherein the application of the said anthraquinone dyestuff is effected in the presence of a mordant.

18. The process of claim 16 wherein the said textile material is a mordant impregnated textile material.

19. The process of claim 16 wherein a mordant is simultaneously applied with said anthraquinone dyestuff.

20. The process of claim 16 wherein the said anthraquinone dyestuff is a disulphuric ester.

21. The process of claim 16 wherein said anthraquinone compound is a beta-sulphuric ester of alpha-beta-dihydroxy anthraquinone.

22. In the manufacture of mordant-dyed textile material, the process which comprises printing a textile material with a printing paste comprising a beta-sulphuric ester of alizarine, an aluminium salt and calcium acetate, drying the printed textile material and then steaming the dried material.

23. In the manufacture of mordant-dyed textile materials, the step which comprises applying to textile materials an anthraquinone dyestuff having the probable formula:

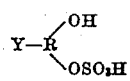

wherein R represents an anthraquinone nucleus and Y represents hydrogen or a hydroxy group, the said $OSO_3H$ group being in a beta position.

24. The process of claim 23 in which the said textile material is cotton.

25. The process of claim 23 in which the said textile material is silk.

26. The process of claim 23 in which the said textile material is wool.

27. In the manufacture of mordant-dyed textile material, the step which comprises applying to the textile material an aqueous solution comprising aluminium sulphate and an anthraquinone dyestuff, having the probable formula:

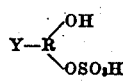

wherein R represents an anthraquinone nucleus and Y represents hydrogen or a hydroxy group, the said $OSO_3H$ group being in a beta position.

28. The process of claim 23 in which the said textile material is mordanted cotton.

29. In the manufacture of mordant-dyed textile material, the process which comprises immersing cotton mordanted with calcium and aluminum, in an aqueous bath comprising calcium chloride, acetic acid and a beta sulphuric ester of alizarine in soluble form, heating the bath while the mordanted cotton is immersed therein, removing the cotton from the bath and subsequently steaming the so-treated cotton.

30. In the manufacture of mordant-dyed textile material, the step which comprises applying to the textile material a beta-sulphuric ester of an alizarine dyestuff.

31. The process of claim 30 in which a mordant is subsequently applied.

32. In the manufacture of mordant-dyed textile material, the process which comprises immersing wool in an aqueous solution comprising a beta-sulphuric ester of an alizarine dye, heating the solution to boiling while the wool is immersed therein, gradually adding acetic acid and sulphuric acid and then adding calcium acetate solution, the boiling being continued during such addition, and finally adding potassium bichromate solution and completing the boiling to obtain the desired shade.

33. In the manufacture of mordant-dyed textile material, the step which comprises applying to the textile material an aqueous solution comprising aluminum sulphate and a beta-sulphuric ester of an alizarine dye.

34. The process of claim 16 in which said sulphuric ester is a disulphuric ester.

35. In the manufacture of mordant-dyed textile material, the process which comprises immersing cotton in an aqueous dye bath comprising an aluminum sulphate and a disulphuric ester of an alizarine dyestuff, gradually heating the dye bath to boiling while the cottom is immersed therein, continuing the boiling and adding a solution of calcium acetate, removing the so-treated cotton from the bath and working in a solution of sodium arsenate at about 60° C., and subsequently steaming the so-treated cotton at about 15 pounds pressure and finally soaping and drying.

36. The process of claim 16 wherein two mordants are used to produce the desired shade.

In testimony whereof we affix our signatures.

RONALD SIDNEY BARNES.
DUNCAN SERVICE.
J. THOMAS.